United States Patent [19]

Kadin

[11] Patent Number: 4,606,041

[45] Date of Patent: Aug. 12, 1986

[54] FREQUENCY HOPPING DATA COMMUNICATION SYSTEM

[75] Inventor: Joseph Kadin, Florham Park, N.J.

[73] Assignee: ITT Corporation, New York, N.Y.

[21] Appl. No.: 662,490

[22] Filed: Oct. 19, 1984

[51] Int. Cl.[4] .................. H04L 27/26; H04L 1/08; H04B 15/00

[52] U.S. Cl. .................................... 375/1; 371/69; 375/40; 375/48; 375/115

[58] Field of Search .............. 375/1, 2.2, 40, 48, 375/62, 89, 115, 45, 51; 364/717; 331/78; 333/17; 343/5 PN; 367/39; 455/27, 29; 178/22.01; 371/37, 39, 40, 41, 69; 370/18, 19, 21, 107

[56] References Cited

U.S. PATENT DOCUMENTS

| | | | |
|---|---|---|---|
| 2,939,109 | 5/1960 | Newby | 371/69 |
| 3,701,019 | 10/1972 | Jackson | 375/1 |
| 4,037,159 | 7/1977 | Martin | 375/1 |
| 4,041,391 | 8/1977 | Deerkoski | 375/1 |
| 4,231,113 | 10/1980 | Blasbalg | 375/1 |

Primary Examiner—Benedict V. Safourek
Attorney, Agent, or Firm—John T. O'Halloran; Jeffrey P. Morris

[57] ABSTRACT

A frequency hopping data communication system which provides reliable communication in a fading environment and also which is jam resistant is described, in which an improved frequency hopping data communication system provides reliable communication in a fading environment such as in a mobile, satellite or scatter communication systems. Pseudo-noise code streams are time displaced with respect to each other, and provide a frequency hopping rate equal to n times the rate of repeated binary data being transmitted, and wherein the pseudo-noise codes are used to directly derive a hopped frequency from a selected code sequence.

17 Claims, 5 Drawing Figures

FREQUENCY HOPPING DATA COMMUNICATION SYSTEM

BACKGROUND OF THE INVENTION

The present invention relates to spread spectrum data communication systems and more particularly to a frequency hopping data communication system.

The spread spectrum communication system has been used in a variety of fields. In a communication system of this type, the transmitted bandwidth is much greater than the bandwidth or rate of the information to be transmitted. The carrier wave is modulated by some other function to widen or spread the bandwidth for transmission. The received signal is remapped into the orignal information bandwidth to reproduce a desired signal. The spread spectrum communication system has many useful advantages; a selective call as possible; since the power spectrum density is low, private communication is allowed; and it is little influenced by interference either due to multipath fading or jamming. From this standpoint, the spread spectrum system has found many uses such as in mobile communications, avionics systems, satellite communication systems, scatter communication systems of both the ionospheric and tropospheric type systems, direction finders and distance measuring equipment.

The spread spectrum system can be catagorized into a direct sequence system, a frequency hopping system, a time hopping system and a hybrid system which is a proper combination of the systems just mentioned. Of those communications systems, the frequency hopping system is frequently used in the field of mobile communication with a low traffic volume for a number of stations. Also frequency hopping systems can be employed in satellite communication systems and scatter type communication systems where a fading environment is present.

In the frequency hopping system a carrier frequency is shifted or jumped in descrete increments in a pattern dictated by prepared code sequences (e.g. a pseudo-noise code, M-sequence codes, Gold codes and the like) in synchronism with a change in the state of the codes. The resulting consecutive and time sequential frequency pattern is called a hopping pattern and the duration of each hopping frequency is called a chip. The transmitted information is embedded in the codes or embedded in each frequency of the carrier wave by so-called FSK (frequency shift keying) modulation. The information signal thus spread-spectrum-modulated is reproduced by a receiver.

In reproducing the information signal by the receiver, a synchronization acquisition process is first performed, in which the code pattern provided in the receiver is made accurately coincident with the code pattern generated in the transmitter in time-position. Then, the spread spectrum signal is despread, and thereafter a well known demodulation is performed to extract the desired information. More particularly, a local reference signal of a frequency correspondingly determined by the same code pattern as that in the transmitter for every chip and the received signal are mixed in a mixer in order to perform a correlation (despreading) process for converting the spread spectrum signal into the signal having a frequency bandwidth wide enough to extract the information. This system is described in detail in "Spread Spectrum Systems" by R. C. Dixon, published by John Wiley & Sons, Inc. in 1976. Following this despreading process, the desired information is extracted by a usual demodulation technique.

Such a system is not only useful in obtaining a proper coherent transmission in a fading environment, such as is present in mobile communications, satellite communications and scatter communication systems, the system is also jammer resistant.

SUMMARY OF THE INVENTION

An object of the present invention is to provide a frequency hopping data communication system which provides reliable communication in a fading environment and also which is jam resistant.

Another object of the present invention is to provide an improved frequency hopping data communication system which provides realiable communication in a fading environment such as in a mobile, satellite or scatter communication systems and which is also jam resistant.

A feature of the present invention is the provision of a frequency hopping data communication system comprising first means to produce identical first and second pseudo-noise code streams time displaced with respect to each other, each of the first and second code streams providing a frequency hopping rate equal to n times the rate of binary data being transmitted, the binary data being repeated x times, where n and x are integers greater than one; second means coupled to the first means, the second means being responsive to the repeated data and the first and second code streams to provide a modulated signal for conveying the data, the modulated signal having different randomly occurring frequencies representing both binary conditions of the repeated data and random spacing between the randomly occurring frequencies representing each of the binary conditions of the repeated data, each bit of the repeated data being represented by n of the randomly occurring frequencies; third means coupled to the second means to receive the modulated signal and to separate the randomly occurring frequencies representing each of the binary conditions from the received modulated signal; fourth means coupled to the third means to recover the data from the separated, received modulated signal; and fifth means coupled to the third means and the fourth means to synchronize the third means to the received modulated signal.

Another feature of the present invention is the provision of a frequency hopping data transmitter comprising first means to produce identical first and second pseudo-noise code streams time displaced with respect to each other, each of the first and second code streams providing a frequency hopping rate equal to n times the rate of binary data being transmitted, the binary data being repeated x times, where n and x are integers greater than one; and second means coupled to the first means, the second means being responsive to the repeated data and the first and second code streams to provide a modulated signal for conveying the data, the modulated signal having different randomly occurring frequencies representing both binary conditions of tne repeated data and random spacing between the randomly occurring frequencies representing each of the binary conditions of the repeated data, each bit of the repeated data being represented by n of the randomly occurring frequencies.

A further feature of the present invention is the provision of a frequency hopping data receiver comprising first means to receive a transmitted signal for conveying binary data, the transmitted signal being produced from identical first and second pseudo-noise code streams time displaced with respect to each other, each of the first and second code streams having a frequency hopping rate equal to n times the rate of the data, the binary data being repeated x times, where n and x are integers greater than one, the transmitted signal having different randomly occurring frequencies representing both binary conditions of the repeated data and random spacing between the randomly occurring frequencies representing each of the binary conditions of the repeated data, each bit of the repeated data being represented by n of the randomly occurring frequencies; second means coupled to the first means to separate the randomly occurring frequencies representing each of the binary conditions from the received transmitted signal; third means coupled to the second means to recover the data from the separated, received transmitted signal; and fourth means coupled to the second means and the third means to synchronize the second means to the received transmitted signal.

Still a further feature of the present invention is to employ in the communication system, the transmitter and the signal received by the receiver a repetition of the data a predetermined number of times prior to the frequency hopping process so as to provide increased reliability of communication in a fading environment and to further improve the immunity of the system, transmitter and receiver to the effects in a jamming environment.

BRIEF DESCRIPTION OF THE DRAWING

The above-mentioned and other objects and features of the present invention and a manner of obtaining them will become more apparent by reference to the following description taken in conjunction with the drawing, in which.

DESCRIPTION OF THE PREFERRED EMBODIMENT

The major problem experienced to date in high frequency systems and high frequency slow hopping systems are that they can be jammed by repeater jammers. Hopping at slow speed was considered necessary due to the dispersive charactristics of the high frequency environment. The advantage against repeater jammers in a fast hopping system is mitigated by the fact that the time delay of the hopped signal can vary up to approximately 5 milliseconds. As such, the receiver would of necessity stay open for periods of time longer than the transmitted hopped interval. The repeater jammer would receive our signal, smear it with noise and retransmit the signal in plenty of time to enter our receiver time window to jam our signal. The effects are particularly strong against digital signals requiring low bit error rates.

Figure 1:
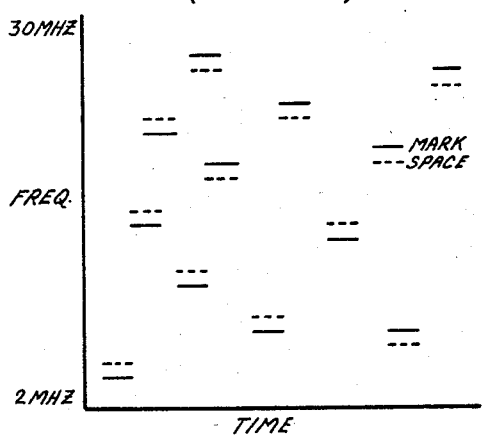
FIGS. 1 and 2 illustrate respectively a frequency versus time diagram and a receiver filter response diagram of prior art FSK systems.
Figure 2:
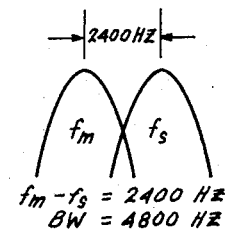

The effectiveness of the frequency hopping data communication system of the present invention can best be described by comparing the instant system to the standard FSK system. A standard FSK system will have a mark and space filter symmetrically located around the carrier frequency within the received bandwidth (i.e., 2400 hertz) as illustrated in FIG. 2, with this precise constant spacing between the mark frequency and the space frequency being present regardless of how the signal is hopped as illustrated in FIG. 1. As such, the prior art system can be jammed by the repeater jammer. The jammer simply receives one of our signals and retransmits it smeared with noise across both mark and space filters.

Figure 3:
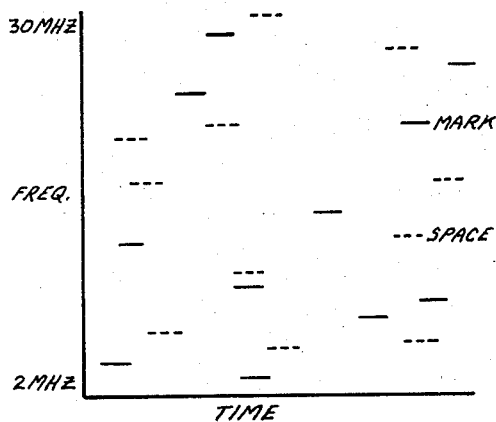
FIGS. 3 and 4 illustrate respectively a frequency versus time diagram and the FSK waveforms for a frequency hopping data communication system in accordance with the principles of the present invention.
Figure 4:
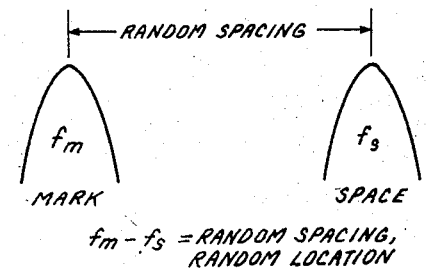

In the system of the present application, only one frequency is transmitted at a time (the frequency selected on a bit instant by the code generators). The location of the mark and space frequencies will be randomly chosen over the whole bandwidth. Their location will be known at both ends of the link by the synchronized code generators. This arrangement is shown in FIGS. 3 and 4. If in the receiver we agree with the mark frequency, we know that mark was sent and vice versa with the space frequency. At one instant then the frequency spacing could be as much as 28 megahertz or as little as 1200 hertz. The spacing between the mark and space frequencies will vary at a random rate as determined by code generators. Jammers upon receiving this signal and attempting to jam our system by smearing or adding additional energy will only add additional power to our received signal helping our detection process. The jammer cannot confuse our system by making the mark look like a space and vice versa, since he does not know the other frequency not having our complex, non-linear code generators set to the exact same timing and key variable.

Figure 5:
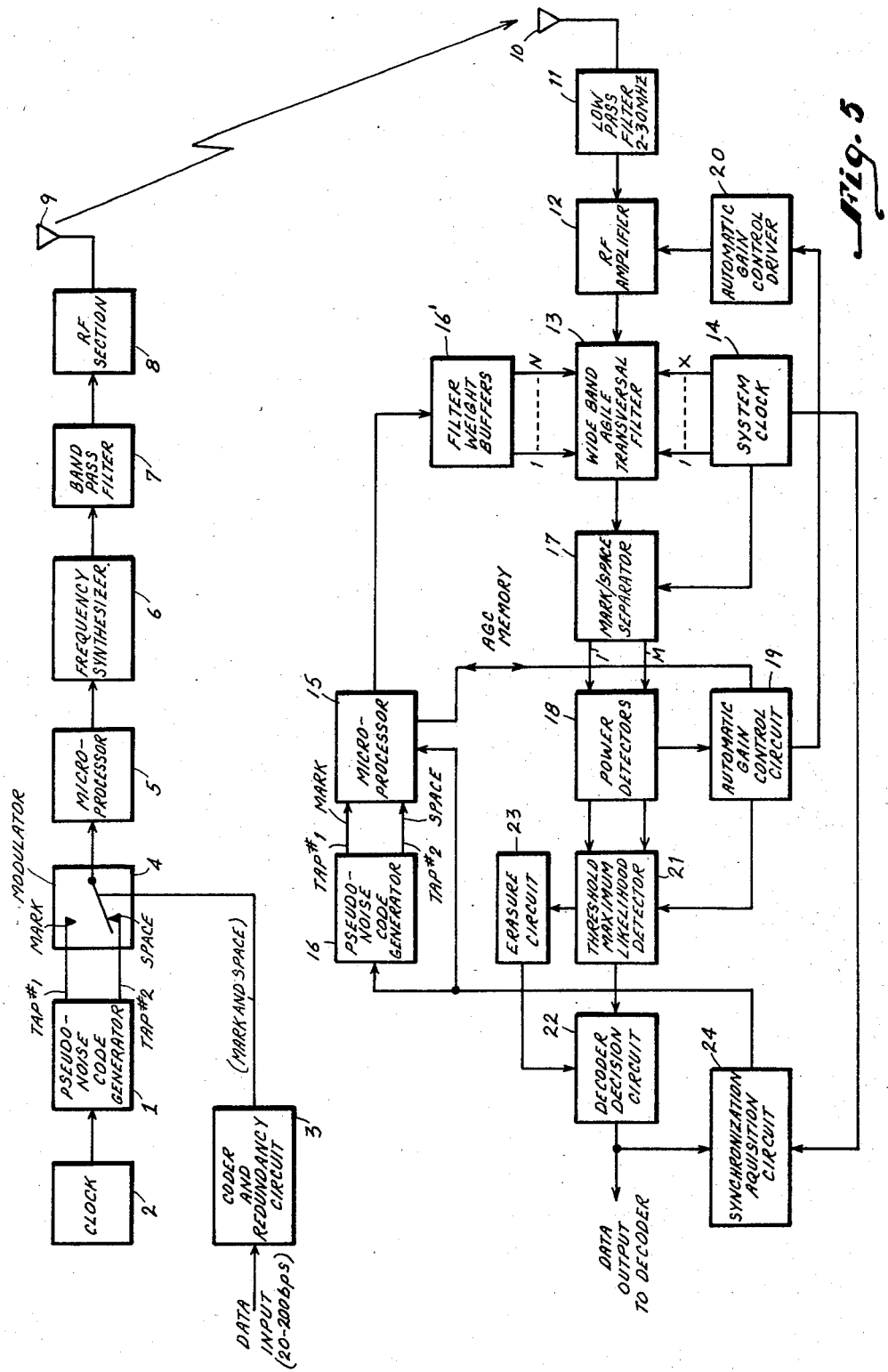
FIG. 5 is a block diagram of a frequency hopping data communication system in accordance with the principles of the present invention.

The frequency hopping data communication system illustrated in block diagram form in FIG. 5 is a fast hopping system operating at multiple hops per data bit which offers attractive features against partial band jammers, repeater jammers and as a tool against dispersion or fading in a fading environment, such as in mobile communication systems, satelite communication systems and scatter communication systems. The frequency hopping rate is adequate to give independent, non-correlated fading between the frequency hops defining a single data bit. The hop rate will be adequate to prevent nominal repeater jammers. Majority logic or an erasure code mode can be used to recognize a jammer. With significant redundancy an erasure mode is a powerful tool. With twelve repeats of the data the jammer would have to wideband jam over 90% of the possible spectrum. For twenty-four repeats of the data the jammer would have to jam over 95% of the spectrum. If there is independent fading between the jammer and our transmission, it will not be feasible for the jammer to jam the system. The hop rate is adequate to isolate the different ionospheric layers and to prevent intersymbol interference.

As an example the system will be described as employing a hop rate of 4.8 KHPS (kilohops per second), a data rate of 75 BPS (bits per second) with a repetition of the data equal to 63 times. In this example each data bit will be represented by 64 different random frequencies.

Referring to FIG. 5, the communication system will now be described. The pseudo-noise code generator 1 under control of clock 2 provides two identical pseudo-noise code streams time displaced with respect to each other with each of the code streams providing a frequency hopping rate equal to n times the rate of the binary data being transmitted. In the example employed, the frequency hopping rate would be 4.8 KHPS, the bit rate would be 75 BPS and n would be equal to 4. Generator 1 may be any one of the pseudo-noise code generators disclosed in U.S. Pat. No. 4,142,240 issued Feb. 27, 1979 to C. R. Ward and R. A. Reiley, assigned to the same assignee as the instant application, whose disclosure is incorporated herein by reference. The data input to be transmitted is coupled to a coder and redundancy circuit 3 where the input, whether speech or data, is modified by adding parity bits of an error detection and error correction code. The coder may be any one of the available error correction codes modified for erasure mode decoding such as a convolutional, Reed-Solomon, or BCH (Bose-Chaud Huri-Hocquenghem). A rate one half code is assumed in our preferred approach. The resultant code will be redundantly repeated a predetermined number of times such as 32. The resultant output of circuit 3 is coupled to a modulator 4 to which the two taps from code generator 1 are also coupled. Modulator 4 may be a switching type modulator which responds to a mark signal to pass one of the pseudo-noise code streams and to a space signal to pass the other pseudo-noise code streams. The resultant output of modulator 4 is coupled to microprocessor 5 which includes therein a table of values which determines the frequency generated by the frequency synthesizer 6. The actual value selected from the table of values selected on the basis of the binary number represented by the pseudo-noise code stream at the output of modulator 4. The frequency synthesizer 6 can be quickly changed to provide different signal pulses representing different frequencies with these frequencies being random in nature due to the random nature of the pseudo-noise code streams produced in generator 1.

The output of frequency synthesizer 6 is coupled to an agile (hopping) bandpass filter 7 and, hence, to an RF section 8 for transmission from antenna 9. The output of the frequency synthesizer 6 is a signal having different randomly occuring frequencies representing both binary conditions of the binary data and a random spacing between the randomly occurring frequencies representing each of the binary conditions of the binary data with each bit of the binary data being represented by 64 randomly occurring frequencies in the example employed herein.

The signal transmitted from antenna 9 is received at a distant receiver on antenna 10 and coupled to a low pass filter 11 whose output is restricted to 2–30 MHz (megahertz) and is coupled to an RF amplifier 12. The output of amplifier 12 is coupled to a wideband agile transversal filter 13 which is of the type disclosed in U.S. Pat. No. 4,164,628 issued Aug. 14, 1979 to C. R. Ward and R. A. Reiley, assigned to the same assignee as the instant application, whose disclosure is incorporated herein by reference. Filter 13 may include X integrated circuit chips each of which includes X shift registers of the type disclosed in the immediately above-identified patent. Each of the integrated chips is under control of a different clock from the system clock 14 and the $N_1$ weights from microprocessor 15 are coupled by buffers 16 to the various shift registers so that a single output is produced for each of the frequencies received on antenna 10 and passed by filter 11 and amplifier 12. Microprocessor 15 has the same table of frequency values as does microprocessor 5 of the transmitter so that either the received mark or space transmitted frequencies can be received. Microprocessor 15 is under control of a pseudo-noise code generator 16 of the type described with respect to code generator 1. The output of filter 13 is coupled to a mark/space separator 17 which is also under control of the system clock 14. The two outputs of separator 17 are coupled to power detectors 18 so that the relative power of the mark and space channels passed by the separator 17 can be measured and indicate whether a mark or space has been transmitted. It should be noted that while we are concerned in the instant application with a two condition, binary type modulation there are other types of modulations that could be employed which would have more than two distinct conditions. Thus, the separator 17 could be used to separate M conditions which in the instant application is equal to two, but with other types of codes could be greater than two.

Power detectors 18 as mentioned previously provide an indication of the power of the signals passed by separator 17 and could be a square law type detector. A signal indicating the power present in the input signal to detectors 18 is coupled to automatic gain control circuit 19 which in turn controls the gain of RF amplifier 12 through automatic gain control driver 20. Circuit 19 also provides a gain control signal to threshold maximum likelihood detector 21 for setting its thresholds and provides a signal to microprocessor 15 indicating the magnitude of the pulse being received at that instant and at that frequency. Gain control circuit 19 also receives an input from microprocessor 15 to indicate the gain that should be present for the expected input signal levels.

Maximum likelihood detector 21 is a two amplitude level threshold detector whose threshold levels are adjusted by automatic gain control circuit 19 to provide the thresholds necessary for the expected pulse in the time frame being examined. A single pulse appearing between the two threshold levels in detector 21 will be passed to the decoder circuit 22.

The decoder will detect and correct for errors in transmission (fading) or due to jamming by recognizing the coded transmission patters of parity bits and signal bits modified by the erasure information. The decoder will be of the complementary type of the coder 3 being either of the convolutional, Reed-Solomon, or BCH (Bose-Cnaud Huri-Hocquenghein) codes.

The decoder decision circuits will utilize the redundant transmissions and erasure detections to eliminate jammed or faded transmitted bits from being fed to the decoder. It will also enhance the remaining bits by processing, using majority logic, or diversity addition, or alternately process the redundant decoder corrected outputs.

Since each data bit will be transmitted redundantly at many different frequencies, it will be extremely difficult for a partial band jammer to effect all frequencies and destroy the information of any one bit of data. Using the erasure mode detection, it may be possible to recognize the correctly transmitted bit if only one of the redundant frequencies comes through clearly. In addition, even if some of these bits are totally jammed, the coder can correct for up to 30% of its received bits being erased and still output a $10^{-3}$ bit error rate.

Similarly, in a faded environment it is highly unlikely that all the frequencies of a single bit transmitted redundantly can be jammed at the same time. Should this highly unlikely condition occur, the decoder will correct for as many as 30% of the bits being faded and erased.

Two pulses occurring simultaneously between the two levels or a pulse having a greater amplitude than the top threshold level or a pulse having an amplitude less than a lower threshold will be recognized by erasure circuit 23 to be a jamming signal or a severe fade, respectively, and an output from circuit 23 will be coupled to decision circuit 22 to insure that this circuit ignores any output from detector 21 that might be caused by a jamming signal or a sever fade.

For the receiver to work in synchronism with the transmitter of the communication system of the instant application, a synchronization acquisition circuit 24 is coupled to the output of circuit 22 and the output of system clock 14. Acquistion circuit 24 will recognize an out-of-sync condition and will cause a slippage of clock pulses until an in-sync condition is recognized, thereby placing the receiver in synchronism with the transmitter by controlling the code generator 16 and microprocessor 15 with the in-snyc condition from circuit 24.

While I have described above the principles of my invention in connection with specific apparatus, it is to be clearly understood that this description is made only by way of example and not as a limitation to the scope of my invention as set forth in the objects therof and in the accompanying claims.

I claim:

1. A frequency hopping data communication system comprising:

first means to produce identical first and second pseudo-noise code streams time displaced with respect to each other, each of said first and second code stream providing a frequency hopping rate equal to n times the rate of binary data being transmitted, and including redundancy circuit means for repeating said binary data x times, where n and x are integers greater than one;

second means coupled to said first means, said second means being responsive to said repeated data and said first and second code streams to provide a modulated signal for conveying said data, said modulated signal having different randomly occurring frequencies representing both binary conditions of said repeated data and random spacing between said randomly occurring frequencies representing each of said binary conditions of said repeated data, each bit of said repeated data being represented by n of said randomly occurring frequencies;

third means coupled to said second means to receive said modulated signal and to separate said randomly occurring frequencies representing each of said binary conditions from said received modulated signal;

fourth means coupled to said third means to recover said data from said separated, received modulated signal; and fifth means coupled to said third means and said fourth means to synchronize said third means to said received modulated signal wherein said first means includes a first pseudo-noise code generator having a pair of taps disposed to provide said first and second code streams time displaced with respect to each other and wherein said second means includes switching means coupled to said first code generator responsive to said repeated data to couple said first code stream to its output upon each occurrence of one of said binary conditions and to couple said second code stream to its output upon each occurrence of the other of said binary conditions, a first microprocessor coupled to said output of said switching means, said first microprocessor having a table of values each of which represents a different one of said different random frequencies, said first microprocessor responding to said first and second code streams to sequentially couple predetermined ones of said values to its output, and frequency generating means coupled to said output of said first microprocessor responsive to said predetermined ones of said values to provide said different randomly occurring frequencies for both of said binary conditions.

2. A system according to claim 1, wherein said third means includes a second pseudo-noise code generator having a pair of taps disposed to provide third and fourth pseudo-noise code streams identical with said first and second code streams, a second microprocessor coupled to said second code generator and a system clock having said hopping rate and a system clock, said microprocessor having said of values and responding to said third and fourth code stream and said system clock to sequentially couple predetermined ones of said values representing said randomly occurring frequencies of both of said binary conditions to its output, a frequency responsive means coupled to said second means, said system clock and said second microprocessor to pass said randomly occurring frequencies representing both of said binary conditions of said received modulated signal, and separator means coupled to said system clock and said frequency responsive means to separate said randomly occurring frequencies representing each of said binary conditions from said received modulated signal passed by said frequency responsive means.

3. A system according to claim 2, wherein said fourth means includes power detector means coupled to said separator means to produce a signal indicating power in each signal coupled thereto and to pass each signal coupled thereto, threshold detecting means coupled to said power detecting means, said threshold detecting means having two spaced amplitude threshold levels controlled by said signal indicating power and passing only those signals coupled thereto in a non-coincident manner having an amplitude disposed between said two threshold levels, decoder decision circuit means coupled to said threshold detecting means to recover said data, and erasure circuit means coupled to said threshold detecting means and said decision circuit means to detect jamming signals and to prevent said detected jamming signals from interfering with recovery of said data.

4. A system according to claim 3, wherein said fifth means includes synchronization acquisition means coupled to the output of said decision circuit means and said second code generator responsive to said recovered data and said system clock to synchronize said third and fourth code streams with said received modulated signal.

5. A system according to claim 1, wherein
said third means includes
- a pseudo-noise code generator having a pair of taps disposed to provide third and fourth pseduo-noise code streams identical with said first and second code streams,
- a microprocessor coupled to said code generator and a system clock having said hopping rate, said microprocessor having a table of values each of which represents a different of of said different random frequencies and responding to said third and fourth code streams and said system clock to couple values representing said randomly occurring frequencies of both of said binary conditions to its output,
- a frequency responsive means coupled to said second means, said system clock and said microprocessor to pass said randomly occurring frequencies representing both of said binary conditions of said received modulated signal, and
- separator means coupled to said system clock and said frequency responsive means to separate said randomly occurring frequencies representing each of said binary conditions from said received modulated signal passed by said frequency responsive means.

6. A system according to claim 5, wherein
said fourth means includes
- power detector means coupled to said separator means to produce a signal indicating power in each signal coupled thereto and to pass each signal coupled thereto,
- threshold detecting means coupled to said power detecting means, said threshold detecting means have two spaced amplitude threshold levels controlled by said signal indicating power and passing only those signals coupled thereto in a non-coincident manner having an amplitude disposed between said two threshold levels,
- decoder decision circuit means coupled to said threshold detecting means to recover said data, and
- erasure circuit means coupled to said threshold detecting means and said decision circuit means to detect jamming signals and to prevent said detected jamming signals from interferring with recovery of said data.

7. A system according to claim 6, wherein
said fifth means includes
synchronization acquisition means coupled to the output of said decision circuit means and said code generator responsive to said recovered data and said system clock to synchronize said third and fourth code streams with said received modulated signal.

8. A system according to claim 1, wherein
said fourth means includes
- power detector means coupled to said third means to produce a signal indicating power in each signal coupled thereto and to pass each signal coupled thereto,
- threshold detecting means coupled to said power detecting means, said threshold detecting means have two spaced amplitude threshold levels controlled by said signal indicating power and passing only those signals coupled thereto in a non-coincident manner having an amplitude disposed between said two threshold levels,
- decoder decision circuit means coupled to said threshold detecting means to recover said data, and
- erasure circuit means coupled to said threshold detecting means and said decision circuit means to detect jamming signals and to prevent said detected jamming signals from interferring with recovery of said data.

9. A system according to claim 8, wherein
said fifth means includes
synchronization acquisition means coupled to the output of said decision circuit means and said third means to synchronize said third means with said received modulated signal.

10. A system according to claim 1, wherein
said fifth means includes
synchronization acquisition means coupled to the output of said fourth means and said third means to synchronize said third means with said received modulated signal.

11. A frequency hopping data transmitter comprising:
first means to produce identical first and second pseudo-noise code streams time displaced with respect to each other, each of said first and second code streams providing a frequency hopping rate equal to n times the rate of binary data being transmitted, and including redundancy circuit means for repeating said binary data x times, where n and x are integers greater than one; and
second means coupled to said first means, said second means being responsive to said repeated data and said first and second code streams to provide a modulated signal for conveying said data, said modulated signal having different randomly occurring frequencies representing both binary conditions of said repeated data and random spacing between said randomly occurring frequencies representing each of said binary conditions of said repeated data, each bit of said repeated data being represented by n of said randomly occurring frequencies wherein said first means includes
- a pseudo-noise code generator having a pair of taps disposed to provide said first and second code streams displaced with respect to each other and wherein said second means includes
- switching means coupled to said code generator responsive to said repeated data to couple said first code stream to its output upon each occurrence of one of said binary conditions and to couple said second code stream to its output upon each occurrence of the other of said binary conditions,
- a microprocessor coupled to said output of said switching means, said microprocessor having a table of values each of which represents a different one of said different random frequencies, said microprocessor responding to said first and second code streams to sequentially couple predetermined ones of said values to its output, and
- frequency generating means coupled to said output of said microprocessor responsive to said predetermined ones of said values to provide said different randomly occurring frequencies for both of said binary conditions.

12. A frequency hopping data receiver comprising:
first means to receive a transmitted signal for conveying binary data, said transmitted signal being produced from identical first and second pseudo-noise code streams time displaced with respect to each other, each of said first and second code streams having a frequency hopping rate equal to n times the rate of said data, and including redundancy circuit means for repeating said data x times, where n and x are integers greater than one, said transmitted signal having different randomly occurring frequencies representing both binary conditions of said repeated data and random spacing between said randomly occurring frequencies representing each of said binary conditions of said repeated data, each bit of said repeated data being represented by n of said randomly occuring frequencies;
second means coupled to said first means to separate said randomly occurring frequencies representing each of said binary conditions from said received transmitted signal;
third means coupled to said second means to recover said data from said separated, received transmitted signal; and
fourth means coupled to said second means and said third means to synchronize said second means to said received transmitted signal wherein
said second means includes
- a pseudo-noise code generator having a pair of taps disposed to provide third and fourth pseudo-noise code streams identical with said first and second code streams,
- a microprocessor coupled to said code generator and a system clock having said hopping rate, said microprocessor having a table of values each of which represents a different one of said different random frequencies and responding to said third and fourth code streams and said system clock to couple values representing said randomly occurring frequencies of both of said binary conditions to its output,
- a frequency responsive means coupled to said first means, said system clock and said microprocessor to pass said randomly occurring frequencies representing both of said binary conditions of said received transmitted signal, and
- separator means coupled to said system clock and said frequency responsive means to separate said randomly occurring frequencies representing each of said binary conditions from said received transmitted signal passed by said frequency responsive means.

13. A receiver according to claim 12, wherein
said third means includes
power detector means coupled to said separator means to produce a signal indicating power in each signal coupled thereto and to pass each signal coupled thereto,
threshold detecting means coupled to said power detecting means, said threshold detecting means, having two spaced amplitude threshold levels controlled by said signal indicating power and passing only those signals coupled thereto in a non-coincident manner having an amplitude disposed between said two threshold levels,
decoder decision circuit means coupled to said threshold detecting means to recover said data, and
erasure circuit means coupled to said threshold detecting means and said decision circuit means to detect jamming signals and to prevent said detected jamming signals from interferring with recovery of said data.

14. A receiver according to claim 13, wherein
said fourth means includes
synchronization acquisition means coupled to the output of said decision circuit means and said code generator responsive to said received data and said system clock to synchronize said third and fourth code streams with said received signal.

15. A receiver according to claim 12, wherein
said third means includes
power detector means coupled to said second means to produce a signal indicating power in each signal coupled thereto and to pass each signal coupled thereto,
threshold detecting means coupled to said power detecting means, said threshold detecting means having two spaced amplitude threshold levels controlled by said signal indicating power and passing only those signals coupled thereto in a non-coincident manner having an amplitude disposed between said two threshold levels,
decoder decision circuit means coupled to said threshold detecting means to recover said data, and
erasure circuit means coupled to said threshold detecting means and said decision circuit means to detect jamming signals and to prevent said detected jamming signals from interfering with recovery of said data.

16. A receiver according to claim 15, wherein
said fourth means includes
synchronization acquistion means coupled to the output of said decision circuit means and said second means to synchronize said second means with said received transmitted signal.

17. A receiver according to claim 12, wherein
said fourth means includes
synchronization acquisition means coupled to the output of said third means and said second means to synchronize said second means with said received transmitted signal.

* * * * *